United States Patent [19]

Zucker et al.

[11] 4,391,517

[45] * Jul. 5, 1983

[54] METHOD OF MEASURING SPLICE LOSS IN OPTICAL FIBERS

[75] Inventors: Joseph Zucker, Foster City; Arthur H. Fitch, Redwood City, both of Calif.

[73] Assignee: GTE Automatic Electric Laboratories, Inc., Northlake, Ill.

[*] Notice: The portion of the term of this patent subsequent to Nov. 23, 1999, has been disclaimed.

[21] Appl. No.: 257,697

[22] Filed: Apr. 27, 1981

Related U.S. Application Data

[63] Continuation-in-part of Ser. No. 205,844, Nov. 10, 1980, Pat. No. 4,360,268.

[51] Int. Cl.³ .............................................. G01N 21/84
[52] U.S. Cl. .................................. 356/73.1; 250/228; 356/434
[58] Field of Search ...................... 356/73.1, 434, 435, 356/236; 250/228; 350/96.15, 96.16, 96.20

[56] References Cited

PUBLICATIONS

"Hot Splices of Optical Waveguide Fibers", Kohanzadew, Applied Optics, Mar. 1976, vol. 15, No. 3, pp. 793-795.

Primary Examiner—Vincent P. McGraw
Attorney, Agent, or Firm—Russell A. Cannon

[57] ABSTRACT

A method of determining splice loss $10 \log (1 - P_R/P_O)$ that is practiced at the location of a splice between one ends of input and output fibers. A reference level $P_O$ of light that is transmitted out of the one end of the input fiber is obtained by inserting it into an integrating cylinder of split block construction, prior to making the splice, and coupling diffuse light in the cylinder to a radiometer. After the ends of the fibers are spliced together, the splice and a significant portion of the adjacent length of output fiber exhibiting substantial leaky mode radiation that is caused by the splice, is located in the cylinder. With light of the reference level in the input fiber being incident on the splice, the radiometer provides an indication $P_R$ of light lost as a result of the splice. The indication $P_R$ may also be obtained by integrating only light radiated from a length of the leaky mode section of output fiber, which has been found to extend to approximately one foot downstream of the splice.

13 Claims, 3 Drawing Figures

METHOD OF MEASURING SPLICE LOSS IN OPTICAL FIBERS

RELATED APPLICATIONS

This is a continuation-in-part of application Ser. No. 205,844, filed Nov. 10, 1980, now U.S. Pat. No. 4,360,268, which is incorporated herein by reference.

BACKGROUND OF INVENTION

This invention relates to determining the integrity of splices in optical fibers, and more particularly to a method for measuring splice loss that may be practiced solely at the location of the splice.

Method and apparatus for measuring the insertion loss of a splice between one ends of a pair of optical fibers are described in the article "Hot Splices of Optical Waveguide Fibers" by Y. Kohanzadeh, Applied Optics, March, 1976/Vol. 15, No. 3, pages 793-795. In accordance with the reference, splice loss is defined as $$10 \log (1 - P_s/P_O) \tag{1}$$

where $P_s$ is a measure of light scattered from the splice and $P_O$ is a measure of light transmitted in the input fiber and incident on the splice. Such a splice loss measurement technique has particular advantage in field applications since it can be practiced solely at the location of the splice. More specifically, it does not require access to he other ends of the fibers, which may be spaced many kilometers from the splice. Applicants have recently discovered that in many instances such an indication of splice loss, which only utilizes a measurement of light scattered frowm the splice itself, is not an accurate indication of the true splice loss and the integrity of the splice. An object of this invention is the provision of an improved method of measuring splice loss that may be practiced solely at the location of the splice.

SUMMARY OF INVENTION

In accordance with this invention, an indication of the loss $10 \log (1 - P_R/P_O)$ caused by a splice between ends of input and output optical fibers is obtained with a measurement $P_R$ of radiant power radiated away from the output fiber in at least a significant portion of the length thereof extending downstream of the splice and exhibiting substantial leaky mode radiation as a result of the splice, for a radiant power $P_O$ in the input fiber and incident on the splice. The indication $P_R$ is preferably obtained by integrating radiant power scattered from the splice and radiant power radiated from a significant portion of the adjacent leaky mode section of output fiber.

DESCRIPTION OF DRAWINGS

This invention will be more fully understood from the following detailed description of preferred embodiments thereof, together with the drawing in which parts are not drawn to scale. In the drawing.

DESCRIPTION OF PREFERRED EMBODIMENTS

Figure 1:
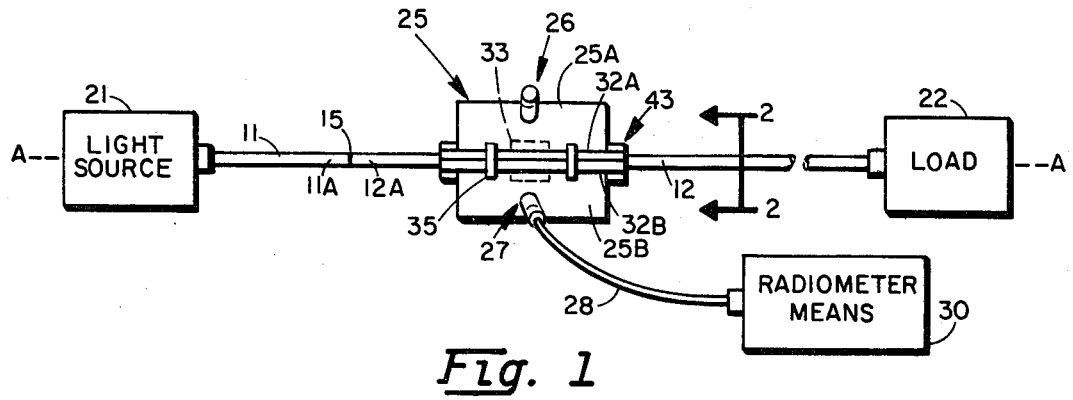
FIG. 1 is a schematic representation of apparatus useful in practicing the method of this invention, a plan view of an integrating cylinder 25 of split block construction being shown here.

Referring now to FIG. 1, apparatus for practicing this invention comprises an input fiber 11 that is connected to a light source 21, an output fiber 12 that is connected to a load 22, an integrating cylinder 25 of split block construction, and radiometer means 30. An optical fiber bundle 28 connects the radiometer to an output port 27 of the integrating cylinder. It is desirable to be able to produce an accurate indication and/or measure of the insertion loss of a splice 15 between the one ends 11A and 12A of the fibers.

The integrating cylinder 25 is an enclosure that converts input light into diffuse light in the interior thereof. Integrating enclosures are manufactured by Labsphere of New London, New Hamsphire. The integrating cylinder 25 is split into halves 25A and 25B by a cutting plane that is orthogonal to the plane of the paper, along the line A—A that includes the axes of the fibers. Flanges 32A and 32B extend around the circumference of the open edges of the top 25A and bottom 25B of the cylinder, with a hinge 33 being attached to the rear of the flanges to facilitate opening and closing the cylinder. Alignment holes and pins (not shown) may be located along the flanges for providing precision alignment of the interior surfaces of the cylinder parts. The two halves of the integrating cylinder are secured together with clamps 35 on the flanges to form a light tight enclosure.

The top 25A of the cylinder contains an input port 26 comprising a socket receiving a fiber connector that is adapted for releasably holding the one end 11A of the input fiber prior to forming the splice, as is described more fully hereinafter. The bottom of the cylinder contains the output port 27 comprising a socket that is dimensioned for receiving a ferrule that is attached to one end of the fiber bundle 28. The sockets of the input and output ports are oriented so that a light ray emanating into the cylinder form a fiber in the input port will not be directly incident on the end of a bundle fiber inside the cylinder.

Figure 2:
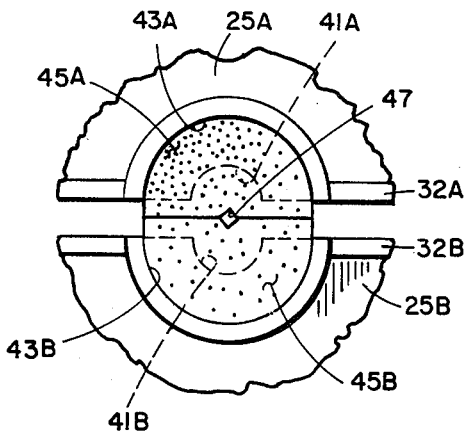
FIG. 2 is an enlarged side view of a portion of the integrating cylinder prior to clamping the parts thereof together, and taken along line 2—2 in FIG. 1.

Each of the cylinder parts includes axially-aligned spaced-apart semicircular openings that extend through the wall thereof and which are coaxial with the axis A—A of the cylinder. The semicircular openings, e.g. openings 41A and 41B, mate for forming a circular opening that is larger than the diameter of the fibers when the cylinder parts are clamped together. Semicylindrical channels, such as the channels 43A and 43B in FIG. 2, are also formed in the flanges coaxial with the cylinder axis A—A and thus associated ones of the circular openings. Associated channels also mate when the cylinder parts are clamped together. The semicircular channels 43A and 43B, for example, are filled with inserts 45A and 45B of a resilient dielectric material such as a flexible polyester polyurethane foam that extends above the tops of the associated flanges 32A and 32B when the cylinder is open, see FIG. 2. Shallow troughs 47 are cut into the facing surfaces of the foam inserts to facilitate locating connected optical fibers 11 and 12 along the cylinder axis A—A when the cylinder is open. In operation, the cylinder is closed for firmly sandwiching the fibers between the foam inserts which securely hold them in place without inducing compression modes therein. The sides of the inserts that face into the cylinder are preferably coated with a light reflective paint, as is the interior of the sphere.

In an optical communication system, the input fiber 11 and output fiber 12 are preferably of the same diameter and type. The one end of the output fiber may be spaced many kilometers away from a load 22 which may be an optical receiver. In such a system, the input fiber may be a pigtail on a light source 21 such as a laser diode. Alternatively, the one end of the input fiber may be spaced a considerable distance from an optical transmitter including such a light source. If the input fiber is not associated with a light source in an existing system, the source 21 may be any suitable device that can be connected to the other end of the input fiber. The light source 21 is preferably similar, however, to what will ultimately be used in a communication link including the spliced fibers 11 and 12.

It has previously been suggested that the insertion loss for a splice be determined according to the relationship in equation (1) where $P_s$ is the radiant power of light scattered primarily from only the splice when light of a radiant power $P_O$ in the input fiber is incident on the splice. The measurement $P_O$ may be obtained prior to making the splice by preparing the one end of the input fiber and inserting it into the input port 26 of the integrating cylinder 25. The light source 21 is then energized for transmitting light along the input fiber and into the closed integrating cylinder which converts it to diffuse light. Bundle fibers 28 couple diffuse light to radiometer means which provides an indication or measure $P_O$ of the radiant power of reference light emitted from the free end 11A of an input fiber. After the one ends of fibers are joined together in a splice 15 using conventional techniques such a fusion welding, epoxy splicing and flame fusion, the spliced fibers are set in grooves of the channel inserts with the splice 15 centered in the cylinder. The cylinder preferably has a very short length such as two inches when it is used for measuring only light scattered from the splice. The cylinder is then closed and the source 21 energized. This causes light of the intensity $P_O$ to be transmitted in the input fiber and be incident on the splice. Light that is scattered by the splice is converted to diffuse light in the cylinder which is coupled on bundle fibers to the radiometer means for producing the indication $P_s$ of the intensity of scattered light.

It has been discovered that the output fiber of a pair of optical fibers connected in a poor splice supports leaky mode radiation of a significant-measurable level over a length of approximately one foot downstream of, i.e. moving away from, a splice. That is, in addition to light in the input fiber being scattered by the splice, some of the input light is converted into leaky modes in the core and cladding of the output fiber. This leaky mode radiation escapes through the circumference of the output fiber and is radiated generally transversely away from the fiber. It has been determined empirically that when fibers are joined in a splice of poor quality, light scattered at the splice itself may be only a small part of the total light lost as a result of radiation from the output fiber and the splice. Stated differently, the amount of leaky mode light radiated out of the fiber downstream of the splice may be greater than that scattered from the immediate vicinity of the splice.

In accordance with one aspect of this invention, the insertion loss of the splice 15 is determined from the relationship $$10 \log (1 - P_R/P_O) \qquad (2)$$

where $P_R$ is a measure of both the amount of light scattered from the splice and the amount of leaky mode light radiated from a significant length of output fiber adjacent the splice that exhibits substantial leaky mode radiation, for light of a radiant power $P_O$ in the input fiber and incident on the splice. The measure $P_O$ may be obtained in the manner described above. Prior to joining one ends of the fibers in a splice such as with a fusion weld, the protective plastic coating is removed from the output fiber over a length of approximately 1.5 feet from the one end thereof. A length of the exposed fiber 12 that is adjacent the completed splice is then set in the grooves of the channel inserts with the splice located just inside the cylinder. The cylinder preferably extends over a substantial portion of the length, e.g. 12 inches, of output fiber exhibiting leaky mode radiation, and is securely closed prior to energizing the light source for illuminating the splice with light of a radiant power $P_O$ which generates leaky mode radiation in the output fiber. The diameter of the cylinder is preferably small, e.g., one inch. Light that is scattered from the splice and is radiated from the circumference of the output fiber adjacent the splice is converted to diffuse light and integrated or summed by the operation of the cylinder. Diffuse light in the cylinder is coupled over bundle fibers 28 to the radiometer which provides the indication $P_R$ of total light loss caused by the splice. The decibel value of splice loss is obtained from equation (2).

This method of indicating splice loss is preferred since it takes into account most of the light scattered from the splice and/or radiated away from the output fiber. The same relative results were obtained with this technique in rating the quality of a number of splices in optical fibers when the enclosure integrated light emitted from the splice plus light emitted from 9-inch and 12-inch lengths of downstream fiber 12. Good results are also obtained with this technique when light scattered from the splice and only 6 inches of downstream fiber was integrated by the enclosure, the difference being that the order of rating some of the fibers was shifted slightly.

In a method embodying another modified form of this invention, the integrating enclosure extends over a limited portion of the downstream length of output fiber exhibiting substantial leaky mode radiation, but not over the splice itself. This length of output fiber may, by way of example, extend from 3 inches to 12 inches downstream of the splice. This alternate method provides a good indication of splice loss. It does not give the exact value thereof, however, since there is some lost light (as a result of the splice) that is not taken into consideration. This alternate method rates the quality of a number of splices in optical fibers in a slightly different order from that obtained with the preferred methods in which the integrating enclosure extends over the splice and the adjacent length of output fiber.

Figure 3:
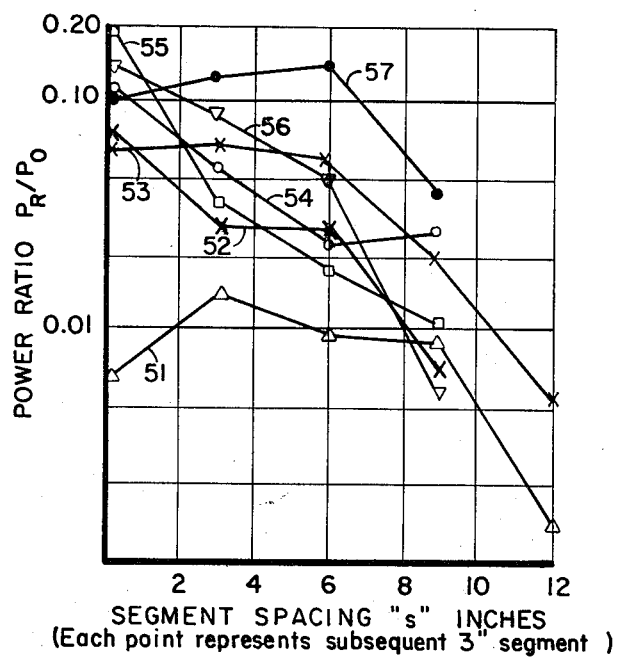
FIG. 3 is curves which are semi-logarithmic plots of $P_R/P_O$ measured along the output fiber for a number of different pairs of optical fibers that are spliced together, a curve and an associated splice (not shown) being identified by the same reference character.

In apparatus that was built and operated for practicing the methods of this invention, the integrating enclosure 25 was an integrating sphere having an inner diameter of 3 inches. Reference to equation (2) reveals that the insertion loss of the splice is a function of the power ratio $P_R/P_O$ and that the highest quality splices have the lowest power ratios. In order to provide a graphic representation of light scattered from a splice and light radiated from lengths of leaky mode output fiber 12, splices were formed in a number of fibers with no special care being taken to obtain precision alignment of the ends of the fibers prior to making a splice. The emitted power $P_R$ scattered from a splice and radiated from a major portion of the immediately adjacent 3-inch length of output fiber 12 was measured by locating the associated fiber along the axis of the sphere with the splice just inside the sphere and illuminated by light of an intensity $P_O$ in the input fiber. It will be recognized that the measurement $P_R$ here is really an integral, since the sphere integrates the light emitted from the splice and the length of output fiber located in the sphere. The sphere was sequentially advanced along the output fiber in 3-inch increments to obtain measurements of the radiated power $P_R$ scattered by successive 3-inch lengths of output fiber exhibiting leaky mode radiation as a result of the splice. FIG. 3 is curves of this power ratio as a function of downstream spacing along the output fiber 12 for a number of different optical fibers that are spliced together. The data is plotted on a semilogarithmic scale which compresses the plot in the vertical direction for convenience of illustration. In describing this data, the curve and associated splice (not shown) are designated by the same reference numeral. In these curves, points at s=0 and 3 inches represent values of $P_R/P_O$ that are obtained by integrating light emitted from the splice and the adjacent approximately 3 inches of output fiber 12, and from the length of output fiber spaced 3 to 6 inches away from the splice, respectively. Similarly, the plots at s=6 and 9 inches represent values of $P_R/P_O$ associated with light radiated from lengths of output fiber spaced 6 to 9 inches and 9 to 12 inches, respectively, from the splice. Leaky mode radiation at points along the output fiber is of a significant level when this power level is readily measurable and is of a magnitude having a real effect on the overall-integrated value of $P_R/P_O$. By way of example, it is no longer of a significant value when it decreases by an order of magnitude from the highest measured value thereof in the downstream length of output fiber. Consideration of the curves in FIG. 3 reveals that leaky mode radiation produced by all of the splices falls to a relatively low level at a distance of approximately one foot away from the splice. The leaky mode radiation at points on all of the output fibers in FIG. 3 falls to a level that is at least an order of magnitude less than a previous high value thereof within a 15-inch downstream length of output fiber. A value for $P_R/P_O$ corresponding to the integral of light emitted or lost from the splice and the adjacent 1-foot length of output fiber is obtained by summing the values of the power ratio for s=0, 3, and 9 inches in FIG. 3.

The best rating of the splices represented by curves in FIG. 3 is obtained in accordance with the preferred embodiment of this invention in which the power ratio $P_R/P_O$ is determined by integrating or summing individual values thereof at the splice and in the three adjacent 3-inch lengths of output fiber (i.e., a 12-inch length of output fiber) that exhibit substantial leaky mode radiation. This preferred rating of the splices, in decending order of quality (i.e. from best to worst) as determined from the above method, is 51, 52, 53, 54, 55, 56, and 57. Consideration of these curves reveals that leaky mode radiation in lengths of output fiber 12 downstream of the splice may be greater than light emitted from the immediate vicinity of the splice for both the best splice 51 and the worst splice 57 represented here. It is also clear from these curves that the total leaky mode radiation from the length of output fiber downstream of the splice is in most instances considerably greater than that scattered by the splice. This is shown analytically by summing the power ratios $P_R/P_O$ at s=3, 6 and 9 for curves 51, for example, to obtain a power ratio of 0.033 and comparing it with the corresponding power ratio of 0.006 associated with the splice 51 itself at s=0. This is not the case, however, for the curve 55. It has been determined empirically that these splices are rated in the same order as for the preferred rating when this power ratio is determined from light emitted from the splice and the adjacent 9-inch length of output fiber exhibiting significant leaky mode radiation. The splices were also rated in the same order as for the preferred rating by summing the power ratios for the splice and adjacent segments of output fiber until the last measured power ratio was down by factors of 10 and 5 from the previous highest measurement thereof. The order in which the splices are rated was only slightly shifted when the resultant power ratio was determined from the splice and a 6-inch length of downstream fiber, and from a length of output fiber extending from 3 to 12 inches downstream of the splice but excluding light scattered from the splice itself. The quality of the splices is rated in a slightly different order when the power ratio $P_R/P_O$ is obtained from only lengths of output fiber spaced 3 to 6 inches, 6 to 9 inches, and 3 to 9 inches away from the splice. Thus, it is desirable to utilize a substantial and significant length of output fiber supporting substantial leaky mode radiation in obtaining a value of $P_R/P_O$ for use in equation (2) and providing a measure of splice loss. A significant length of downstream fiber exhibiting significant leaky mode radiation is also one for which the integral of light radiated from the adjacent downstream segment of output fiber is normally of a value not having a measurable effect on the integral of light radiated from that one length of output fiber.

Although this invention is described in relation to preferred embodiments thereof, other variations and modifications will occur to those skilled in the art. By way of example, the novel method is applicable to radiant energy and light in other than the visible electromagnetic spectrum. Thus, the words light and radiant energy as used here mean both visible light and invisible radiant energy in the high and low ends of the frequency spectrum including both ultraviolet and infrared radiation. Also, the integrating enclosure may be of any convenient shape other than cylindrical and spherical, although it preferably has a regular shape. Further, the enclosure does not have to be split into parts of the same size. Additionally, an optical detector may be located directly in the output port 27 on the enclosure for producing an electrical signal which is applied to an associated meter for producing an indication of the intensity of light in the integrating enclosure. Additionally, a single fiber may be located in the output port for coupling diffuse light to the radiometer means. And if the intensity of diffuse light coupled to the radiometer means is insufficient to obtain clear and definite readings, the light source may be pulsed or the output thereof mechanically chopped at a fixed repetition frequency for producing a varying electrical current in the radiometer means for increasing the sensitivity of the detector in a manner which is well known in the art.

The scope of this invention is therefore defined by the appended claims, rather than the aforementioned detailed descriptions of preferred embodiments thereof.

What is claimed is:

1. The method of measuring the insertion loss of a splice between adjacent one ends of first and second optical fibers comprising the steps of
    transmitting reference light in the first fiber;
    producing a first measurement $P_O$ of the radiant power of the light in the first fiber,
    producing a second measurement $P_R$ of the radiant power of only light radiated generally transversely out of the circumference of only the second fiber in a significant portion of the length thereof that is downstream of the splice and exhibiting substantial leaky mode radiation as a result of the occurrence of the splice, for reference light of the radiant power $P_O$ in the first fiber and incident on the splice, and
    producing an indication of the splice loss from the ratio of the two measurements.

2. The method according to claim 1 wherein said first measurement $P_O$ is a measurement of the radiant power of light in the first fiber and emitted from the one end thereof prior to forming the splice.

3. The method according to claim 1 wherein said second named producing step comprises integrating light radiated out of the circumference of the second fiber in a significant length thereof that is proximate to but downstream of the splice and which exhibits leaky mode radiation.

4. The method according to claim 3 wherein said second named producing step comprises integrating light radiated from a length of second fiber that is spaced between 3 and 9 inches downstream of the splice.

5. The method of measuring the insertion loss of a splice between adjacent one ends of first and second optical fibers comprising the steps of:
    producing a measurement $P_R$ of radiant power of light scattered from the splice and radiated generally transversely out of and away from the output fiber in at least a significant portion of the length thereof extending downstream of the splice and exhibiting substantial leaky mode radiation as a result of the occurrence of the splice, for a given radiant power $P_O$ in the first fiber and incident on the splice, and
    producing an indication of splice loss from the ratio $P_R/P_O$.

6. The method according to claim 5 wherein said first named producing step comprises integrating radiant power scattered from the splice and radiant power radiated out of an adjacent section of second fiber of significant length exhibiting significant leaky mode radiation.

7. The method of measuring the insertion loss of a splice between adjacent one ends of first and second optical fibers comprising the steps of
    transmitting reference light in the first fiber;
    producing a first measurement $P_O$ of the radiant power of the light in the first fiber,
    producing a second measurement $P_R$ of the radiant power of light scattered from the splice and light radiated generally transversely out of the circumference of the second fiber in a significant portion of the length thereof that is adjacent to and extends downstream of the splice and which exhibits substantial leaky mode radiation as a result of the occurrence of the splice, for reference light of radiant power $P_O$ in the first fiber and incident on the splice, and
    producing an indication of the splice loss from the ratio of the two measurements.

8. The method according to claim 7 wherein said second named producing step comprises integrating light scattered from the splice and light radiated away from the circumference of the second fiber in a significant length thereof immediately adjacent the splice.

9. The method according to claim 8 wherein the length of second fiber extends at least 6 inches downstream of the splice.

10. The method according to claim 9 wherein the length of second fiber extends at least 9 inches downstream of the splice.

11. The method of measuring the insertion loss of a splice between adjacent one ends of first and second optical fibers comprising the steps of:
    producing a measurement $P_R$ of radiant power of only leaky mode light radiated generally transversely out of and away from only the output fiber in at least a significant portion of the length thereof that is downstream of the splice and which exhibits substantial leaky mode radiation as a result of the occurrence of the splice, for a given radiant power $P_O$ in the first fiber and incident on the splice, and
    producing an indication of splice loss from the ratio $P_R/P_O$.

12. The method according to claim 11 wherein said first named producing step comprises integrating only radiant power radiated out of only a section of second fiber of significant length that is adjacent to but downstream of the splice and which exhibits significant leaky mode radiation.

13. The method according to claim 1 or 6 or 12 wherein the splice loss is determined from the relationship $10 \log (1-(P_R/P_O))$.

* * * * *